United States Patent [19]
Leiber

[11] 4,077,217
[45] Mar. 7, 1978

[54] TWO-CIRCUIT MASTER CYLINDER UNIT FOR BRAKES

[75] Inventor: Heinz Leiber, Leimen, Germany
[73] Assignee: Teldix GmbH, Heidelberg, Germany
[21] Appl. No.: 681,204
[22] Filed: Apr. 28, 1976
[30] Foreign Application Priority Data
  Apr. 30, 1975  Germany .............................. 2519228
[51] Int. Cl.² ............................................... F15B 7/00
[52] U.S. Cl. ........................................ 60/535; 60/545;
  60/562; 60/591; 303/113; 340/52 C
[58] Field of Search ................. 60/534, 545, 562, 535,
  60/591; 340/52 C; 303/113

[56] References Cited
U.S. PATENT DOCUMENTS

| | | | |
|---|---|---|---|
| 2,169,524 | 8/1939 | Fowler | 60/562 |
| 2,732,918 | 1/1956 | Hackworth | 60/562 |
| 3,060,691 | 10/1962 | Davis | 60/562 |
| 3,412,557 | 11/1968 | Williams | 60/545 |
| 3,526,093 | 9/1970 | Kimura | 60/562 |
| 3,724,910 | 4/1973 | Rossigno | 60/534 |
| 3,938,333 | 2/1976 | Mathues | 60/534 |
| 4,004,425 | 1/1977 | Pickering | 60/562 |

Primary Examiner—Martin P. Schwadron
Assistant Examiner—Abraham Hershkovitz
Attorney, Agent, or Firm—Spencer & Kaye

[57] ABSTRACT

A two-circuit master cylinder unit for brakes includes first and second cylinders and first and second pistons slidably received in the first and second cylinders, respectively. The first piston is actuated by an external force for pressurizing hydraulic fluid in the first cylinder. The second piston is exposed to a pressure which depends upon the pressure generated in the first cylinder. A shackle device which couples the first and second pistons to one another, allows a relative axial displacement of predetermined magnitude between the first and second pistons. A switching device is operatively connected to the shackle device and is actuated when the predetermined magnitude of relative displacement between the pistons is reached. A warning device is operatively connected to the switching device and responds when the switching device is actuated.

10 Claims, 7 Drawing Figures

TWO-CIRCUIT MASTER CYLINDER UNIT FOR BRAKES

BACKGROUND OF THE INVENTION

This invention relates to a two-circuit master cylinder unit for brakes, wherein a first piston is actuated in the usual manner by applying thereto an external force and a second piston is exposed to the pressure generated by the first piston. The unit comprises a switching device which, in case one of the circuits fails, changes its state and acctuates a warning device.

A unit of the afore-outlined type is known and is disclosed, for example, in the leaflet *Bremesen-Service*, published by ATE (Alfred Teves GmbH, a German company of Frankfurt/Main), 1969 Issue, page 01.6, FIGS. 19 and 20. In the structure disclosed in this leaflet there is provided an additional auxiliary piston, the two opposite work faces of which are exposed to the pressure in the one and the other circuit. If one circuit fails, the auxiliary piston is displaced, whereby a contact device is actuated.

SUMMARY OF THE INVENTION

It is an object of the invention to provide a two-circuit master cylinder unit for brakes which does not require an auxiliary piston and which thus is of more economical structure and which further is capable of generating a warning signal at an earlier moment (i.e., it is more sensitive to smaller leaks) than prior art devices.

These objects and others to become apparent as the specification progresses, are accomplished by the invention, according to which, briefly stated, the two pistons of the master cylinder assembly are coupled (shackled) to one another in such a manner that they may move with respect to one another only to a predetermined extent and further, the switching device is disposed in the coupling shackle in such a manner that it is actuated when the relative motion of the pistons exceeds the predetermined extent.

The switching device may be a circuit maker contact assembly which, when the relative motion of the pistons with respect to one another has reached a predetermined magnitude, is closed by the shackle between the pistons, and, as a result a warning circuit is directly or indirectly energized.

The invention may find application in master brake cylinders arranged in tandem in which the two serially-connected pistons are coupled with one another by means of a spacer bar which is moved by one piston and is thus displaced relative to the other piston. The terminal portion of the spacer bar is normally at an intermediate position within the other piston, but in case the two pistons move relative to one another, such relative motion will also occur between the spacer bar and the other piston. Expediently, the spacer bar has an enlarged portion which, on the one hand, limits the relative motion between piston and spacer bar and, on the other hand, actuates the switching device in case the predetermined maximum relative displacement is reached.

The invention may also be incorporated in a master cylinder unit in which the two pistons are in a twin (side-by-side) arrangement. In such a case the actuating lever for the first piston also carries a lever for the second, pressure-controlled piston. The lever for the second piston is coupled to the second piston by a shackle which permits a relative displacement of the two pistons with respect to one another to a predetermined extent, but which constitutes a rigid coupling between the pistons after the predetermined extent of relative displacement is reached. This applies to both directions of the relative displaceability. In this embodiment too, a switching device is provided which responds when the maximum predetermined relative displacement between the pistons is reached and actuates the warning device.

The invention finds particularly advantageous application in two-circuit master cylinders which form part of an anti-lock system (hereafter also referred to as "braking pressure regulating device"), such as discosed in U.S. application Ser. No. 624,572, filed Oct. 21, 1975. According to the disclosure in that application, the first master cylinder is coupled with the control chamber of the piston of the second master cylinder through the series connection of a regulator valve and a throttle. A check valve is parallel-connected with the throttle for the rapid depressurization of the control chamber. Here too, the two pistons are coupled to one another by a shackle device which is operatively connected to the warning arrangement. The invention may also find application in brake systems which incorporate braking force amplifier devices.

In addition to indicate the failure of one of the brake circuits, the invention has the further advantage that it indicates an unequal venting of the brake circuits as well. It is a further advantage of the invention that it also warns of the beginning phase of brake circuit failure due to fluid leakage.

DESCRIPTION OF THE PREFERRED EMBODIMENTS

Figure 1:
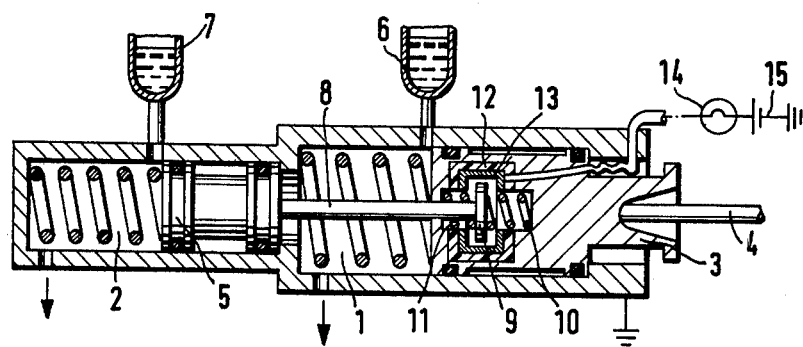
FIG. 1 is a longitudinal sectional view of a tandem master cylinder unit incorporating a preferred embodiment of the invention.

In FIG. 1, the brake cylinders 1 and 2 of a master cylinder unit are in a tandem arrangement. The piston 3 of the brake cylinder 1 is actuated (that is, urged leftward) by a lever 4. As a result, a pressure is generated in the cylinder 1 which directly affects the piston 5 of the cylinder 2. Conventionally, the piston 5 has a diameter which is somewhat smaller than that of the piston 3. The brake fluid is contained in reservoirs 6 and 7 communicating with cylinders 1 and 2, respectively.

The two pistons 3 and 5 are coupled to one another by a shackle which comprises an axially extending spacer bar 8 affixed to the piston 5, a collar 9 constituting the free, enlarged terminus of the bar 8 and springs 10 and 11 disposed in a cavity of the piston 3 and engaging, with one end, the two opposite radial faces of the collar 9. This shackle device ensures that the pistons 3 and 5 may axially freely move with respect to one another to a predetermined extent before the shackle structure becomes effective. Thus, considering an intermediate position as the normal position, the shackle structure determines the maximum relative displacement of the two pistons 3 and 5 in both directions, that is, towards and away from one another.

The piston 3 is provided, in the cavity where the two springs 10 and 11 are disposed, with a metallic insert 13 which is separated from all the other metallic parts of the assembly by an insulation 12 and which is connected to a voltage source 15 and a warning lamp 14. If, in the course of a relative displacement of the two pistons 3 and 5 with respect to one another, collar 9 arrives into engagement with either end of the metallic insert 13, the electric circuit containing the voltage source, the warning lamp, the metallic insert 13, the bar 8, the collar 9 and the surrounding metallic components of the cylinder assembly will be closed by grounding and thus, as a result, the warning lamp 14 will light up, indicating that the two pistons 3 and 5 exceeded their predetermined relative motion with respect to one another in the one or the other direction.

Figure 2:
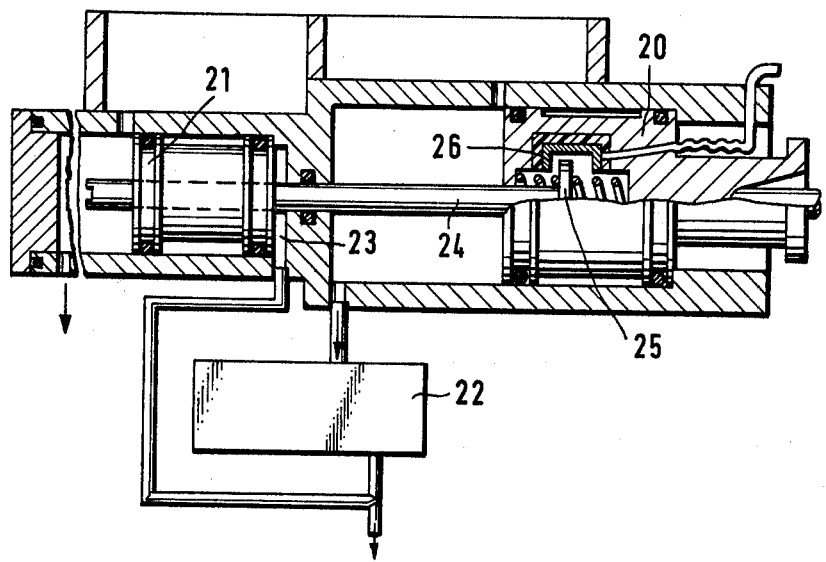
FIG. 2 is a longitudinal sectional view of a tandem master cylinder unit, together with an anti-lock device, incorporating a similar embodiment of the invention.
Figure 5:
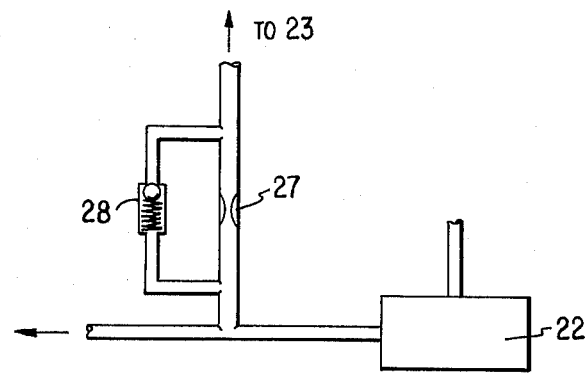
FIG. 5 is a fragmentary view showing an alternative to the pressure regulating device of FIG. 2.

Turning now to FIG. 2, the pistons 20 and 21 of the two brake cylinders are, similar to the embodiment discussed in connection with FIG. 1, disposed in a tandem arrangement. This embodiment differs from that of FIG. 1 in that the braking pressure generated by the first piston 20 is regulated by a braking pressure regulating (anti-lock) device 22 as a function of the motion behavior of the wheels associated with that brake circuit. The regulated braking pressure is used as the control pressure in the control chamber 23 of the second master cylinder which comprises the piston 21. Preferably, this system includes a throttle device 27 (see FIG. 5) which ensures that the pressure in the second braking circuit increases at a slower rate than in the first braking circuit and further, a check valve 28 or the like is coupled parallel to the throttle 27 to ensure a rapid depressurization in the second circuit during a corresponding depressurization in the first circuit. The shackle device that couples the two pistons 20 and 21 with one another is substantially the same as that described in connection with the FIG. 1 embodiment. Thus, when the pistons 20 and 21 tend to approach one another or move away from one another in excess of a predetermined extent, a warning signal is emitted as the warning circuit is closed by closing the contacts formed of the collar 25 and the metal insert 26 (identical to the components 9 and 13, respectively, in the FIG. 1 embodiment).

Figure 3:
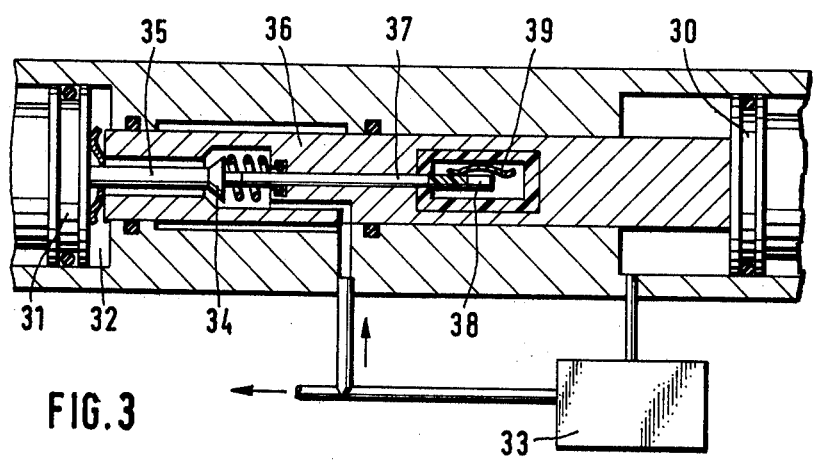
FIG. 3 is a longitudinal sectional view of another preferred embodiment of the invention, including a hydraulic shackle device coupling the pistons of the brake cylinders to one another.

Turning now to the embodiment illustrated in FIG. 3, the tandem master cylinder unit is only fragmentarily shown. The unit has a first piston 30 and a second piston 31 which are coupled to one another by means of a hydraulic shackle device which comprises a slide member 36 affixed to, and extending axially from the piston 30. The pressure which is generated in the first master cylinder and regulated by a braking pressure regulating device 33 (corresponding to the device 22 in the FIG. 2 embodiment), is admitted to the control chamber 32 (with or without the interposition of a throttle as mentioned above) through a valve 34 which normally is maintained in its open position by means of a plunger 35, 37 affixed to the piston 31. The valve 34 is formed of a valve seat defined by inner walls of the slide member 36 and a valve head carried by the plunger 35, 37. In case the two pistons 30 and 31 move away from one another in excess to a predetermined distance, the valve 34 closes and thus prevents a further increase of the distance between the two pistons. As the valve 34 closes, the plunger portion 37 connected with the plunger portion 35 is displaced to such an extent that its non-insulated portion 38 engages the left-hand arcuate terminus of the contact spring 39 and thus an electric circuit will be closed. The conductor which connects the contact spring 39 with the warning circuit, as well as other components of the warning circuit, are not illustrated in FIG. 3.

As may be observed in FIG. 3, the contact spring 39 is shaped in such a manner that an engagement between the electrically conducting portion 38 of the plunger 37 and the spring 39 will also take place when the two pistons 30 and 31 approach one another to an extent which reaches a predetermined limit value.

The device 33 may comprise, in a conventional manner, a booster pump which converts into pressure the volume metered by means of the piston 30.

Figure 4:
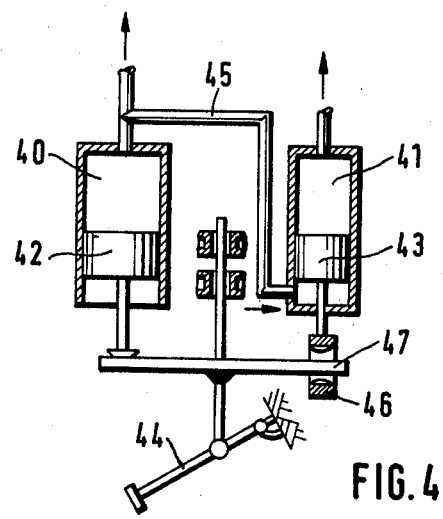
FIG. 4 is a schematic sectional view of a twin master cylinder unit, incorporating a further preferred embodiment of the invention.

Turning now to the embodiment illustrated in FIG. 4, brake cylinders 40 and 41 having respective pistons 42 and 43, are shown in a twin (side-by-side) arrangement. The piston 42 is actuated by a pedal 44 through a lever 47. Normally, the displacement of the piston 43 is effected by the pressure (which may be regulated and throttled) generated in the brake cylinder 40 and transmitted by the conduit 45. The piston 43 has, with respect to the lever 47 and thus also with respect to the piston 42, a predetermined limited freedom of motion as determined by the shackle ring 46 carried by the piston rod of the piston 43 and traversed by the lever 47 with a play which determines the extent of the free motion. Thus, as the predetermined limit of the relative motion between the two pistons 42 and 43 is reached, the shackle becomes a rigid connection between the two pistons and, as a result of the engagement between the lever 47 and the shackle ring 46 (which constitute electric contacts), a warning device is actuated.

It is feasible to actuate the first piston 42 with the interposition of a power brake mechanism.

Figure 6:
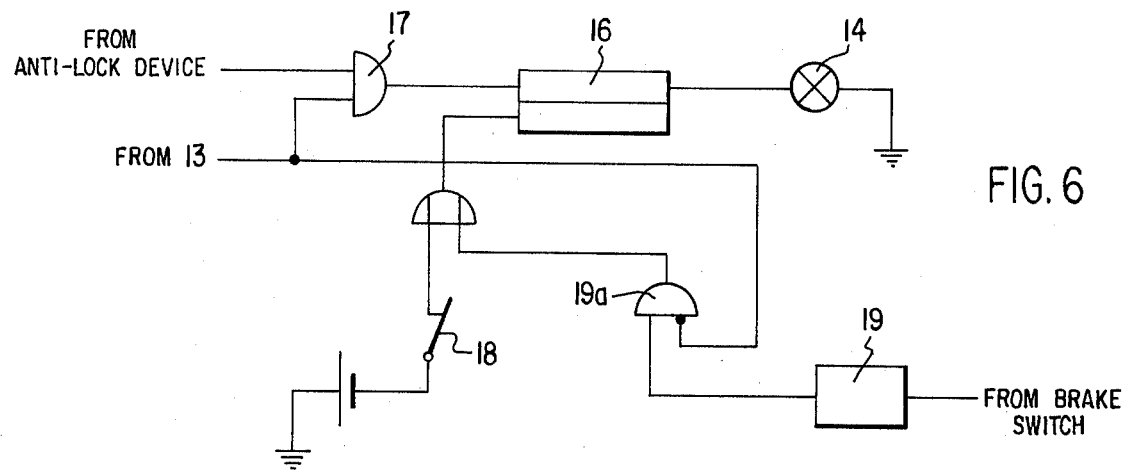
FIG. 6 is a diagrammatic view of a preferred embodiment of a warning device according to the invention.

Between the contacts 9 and 13 of FIG. 1 and the warning lamp 14 a memory member, such as a bistable component 16 may be connected (FIG. 6) which, when a signal is transmitted as a result of an engagement between contacts 9 and 13, is set into the memory state. This setting can be prevented by means of an and-gate 17 if an anti-lock regulator is part of the system and is operating. The resetting of the memory which, in its other state, actuates the warning device, in the initial condition is effected by a switch 18 which is actuated by an operating person; in the alternative, however, or in addition, it may be reset by a delay switch means 19 which becomes effective after a period of, for example, five seconds following brake actuation and causes a resetting if a signal is no longer received from the contacts 9 and 13 (and-gate 19a). In this manner, the generation of erroneous signals can be eliminated.

Figure 7:
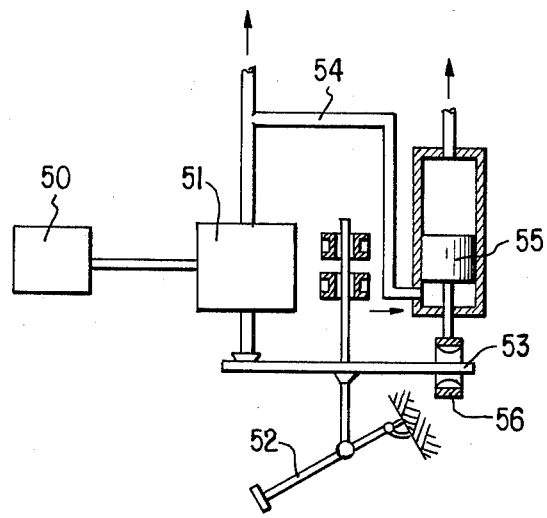
FIG. 7 is a schematic sectional view of a unit which incorporates the invention and which comprises one brake circuit in which the pressure is controlled by a valve arrangement, while the other brake circuit includes a master cylinder.

In FIG. 7 a pressure source 50 and a pressure controlling valve 51 are provided; if the driver actuates the pedal 52 and thus displaces lever 53, a pressure dependent of the actuation will be present in line 54; this pressure is the brake pressure in one brake circuit and displaces a piston 55 in similar manner as in the embodiment of FIG. 4. The shackle means in FIG. 7 correspond to those (46, 47) of FIG. 4; the warning device is actuated if a predetermined relative displacement of the lever 53 and the piston 55 and the shackle ring 56 is reached.

It will be understood that the above description of the present invention is susceptible to various modifications, changes and adaptations, and the same are intended to be comprehended within the meaning and range of equivalents of the appended claims.

What is claimed is:

1. In a two-circuit master cylinder unit for brakes, including a first and a second cylinder; a first and a second piston slidably received in the first and the second cylinder, respectively; means defining a cavity in one of the pistons; means for providing hydraulic communication between the two cylinders; means for applying an external force to the first piston for pressurizing hydraulic fluid in the first cylinder to expose the second piston to a pressure dependent upon the pressure generated in the first cylinder; the improvement comprising
   a. shackle means for coupling said first and second pistons to one another, said shackle means allowing a relative axial displacement of predetermined magnitude of said first and second pistons with respect to one another; said shackle means having
      1. a spacer bar affixed to the other of said pistons and extending into said cavity of said one piston;
      2. an enlargement forming a free terminus of said spacer bar in said cavity;
      3. a component affixed to said one piston within said cavity for abutting said enlargement to limit the longitudinal displacement of said spacer bar with respect to said one piston in either direction; said longitudinal displacement of said spacer bar constituting said relative axial displacement of predetermined magnitude; and
      4. means for urging said enlargement into a normal middle position in which said enlargement is out of contact with said component;
   b. an electric switching means constituted by said enlargement and said component; said electric switching means having contacts maintained in an open state in said normal middle position of said enlargement and maintained in a closed state by the contacting relationship between said enlargement and said component; and
   c. warning means operatively connected to said electric switching means and being responsive to the state of said contacts.

2. A two-circuit master cylinder unit as defined in claim 1, wherein said enlargement constitutes one of said contacts and said component constitutes another of said contacts.

3. A two-circuit master cylinder unit as defined in claim 1, wherein said first and second pistons are in tandem arrangement.

4. A two-circuit master cylinder unit as defined in claim 1, wherein said means urging said enlargement into a normal middle position comprises spring means disposed in said cavity and engaging said enlargement.

5. A two-circuit master cylinder unit as defined in claim 1, wherein said component is an electrically conducting insert insulated from said one piston; said warning means comprising a warning circuit including a voltage source, a warning display device, said enlargement and said insert; said warning circuit being closed by grounding upon contact between said enlargement and said insert.

6. A two-circuit master cylinder unit as defined in claim 1, wherein said means for providing hydraulic communication between the two cylinders includes a braking pressure regulating device for preventing wheel locking.

7. A two-circuit master cylinder unit as defined in claim 6, wherein said means for providing hydraulic communication between the two cylinders includes a throttle for delaying the pressure increase in said second cylinder with respect to said first cylinder, said throttle being arranged between said braking pressure regulating device and said second cylinder; and a check valve connected parallel with said throttle for effecting a rapid depressurization in said second cylinder during depressurization in said first cylinder.

8. A two-circuit master cylinder unit as defined in claim 1, further comprising a memory member connected between said switching device and said warning means, said memory member having a set state and a reset state; said memory member being switched into the set state upon actuation of said switching device and being switched into the reset state only upon applying a separate signal thereto.

9. A two-circuit master cylinder unit as defined in claim 8, further comprising signal transmitting means for emitting said separate signal; said signal transmitting means including an arbitrarily operable resetting switch for applying said signal to said memory member upon actuation of said resetting switch.

10. A two-circuit master cylinder unit as defined in claim 8, further comprising signal transmitting means for emitting said separate signal, said signal transmitting means including delay means for applying said separate signal to said memory member after a predetermined delay following actuation of said first piston and when the switching device is no longer actuated.

* * * * *